UNITED STATES PATENT OFFICE.

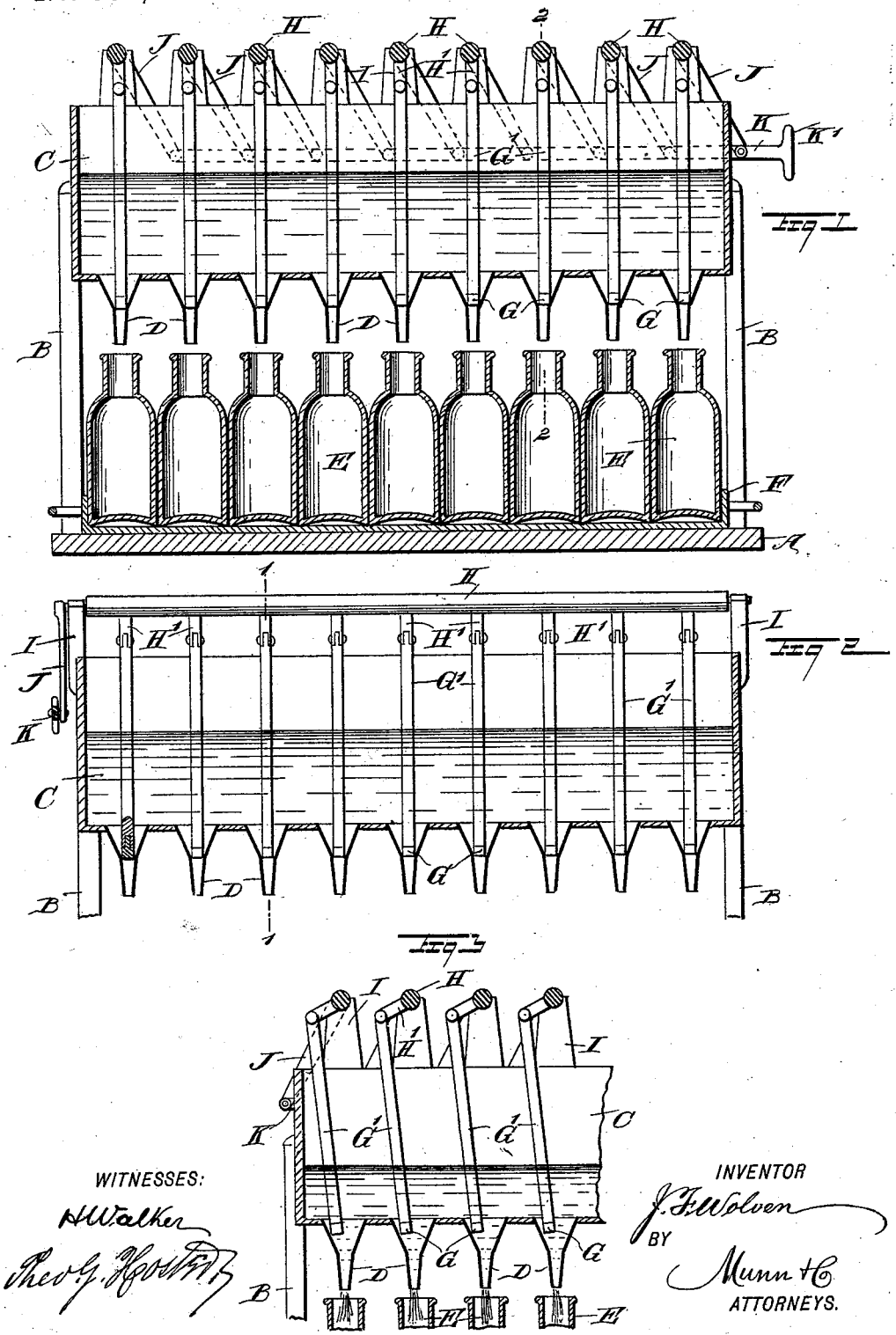

JOHN F. WOLVEN, OF ST. CLAIR, MICHIGAN.

FILLING-MACHINE.

SPECIFICATION forming part of Letters Patent No. 538,941, dated May 7, 1895.

Application filed July 13, 1894. Serial No. 517,455. (No model.)

*To all whom it may concern:*

Be it known that I, JOHN F. WOLVEN, of St. Clair, in the county of St. Clair and State of Michigan, have invented a new and Improved Filling-Machine, of which the following is a full, clear, and exact description.

The object of the invention is to provide a new and improved filling machine, which is simple and durable in construction and arranged to simultaneously fill a large number of vessels with a liquid; for instance, bottles or communion cups in church services.

The invention consists of certain parts and details, and combinations of the same, as will be hereinafter described and then pointed out in the claim.

Reference is to be had to the accompanying drawings, forming a part of this specification, in which similar letters of reference indicate corresponding parts in all the figures.

Figure 1 is a sectional side elevation of the improvement on the line 1 1 of Fig. 2. Fig. 2 is a transverse section of the same on the line 2 2 of Fig. 1, and Fig. 3 is a sectional side elevation of part of the improvement with the valves withdrawn.

The improved filling machine is provided with a suitably-constructed base A, having the standards B supporting on their upper ends a reservoir C, adapted to contain the liquid to be discharged into the vessels to be filled. In the bottom of the reservoir C are arranged rows of funnels D, each adapted to discharge into the vessel E to be filled, the said vessels being arranged in rows and set in a tray F, adapted to be placed on the base A, so that a funnel D is directly over the mouth of a corresponding vessel. Each funnel is adapted to be closed from the inside by a rubber tipped valve G, secured on the lower end of an upwardly-extending valve rod G', pivotally-connected at its upper end with an arm H' projecting from the shaft H, journaled in suitable bearings I attached to the upper end of the reservoir C.

Now, it will be seen by reference to Figs. 1 and 2, that all the valve rods G' for the funnels in a transverse row, are connected with arms H' on a single transverse shaft H, so that when the shaft is turned, the arms H' swing upward to lift the valve rods G', so as to move all the valves G off the funnels in that particular row, to permit the liquid to flow from the reservoir through the said funnels into the corresponding row of vessels E. Each of the shafts H is provided on one outer end with a downwardly-extending arm J, pivotally-connected with a longitudinally-extending rod K, formed at one end with a handle K' under the control of the operator. Now, by this arrangement all the shafts H are connected with the rod K, so that the operator in manipulating the handle K' can simultaneously impart a swinging motion to all the shafts H to cause a simultaneous opening or closing of all the valves G in the machine. When the several parts are in the position, as shown in Fig. 1, then all the valves G are closed and liquid is prevented from flowing from the reservoir C into the vessels E.

When the operator takes hold of the handle K' of the rod K and pushes the same rearward into the position shown in Fig. 3, then the arms J impart a swinging motion to all the shafts H, whereby the arms H' swing upward, lifting the valve rods G' to move the valves G, so as to unseat the same in the funnels D. The latter are thus opened and the liquid can now flow from the reservoir C into all the vessels E to fill the same. As soon as this is accomplished, the operator moves the rod K forward into the position shown in Fig. 1, so that the valves G are again seated in the funnels B to close the same. The tray F supporting the filled vessels can now be removed from the base A and another tray substituted containing empty vessels to be filled. The above described operation is then repeated.

Having thus fully described my invention, I claim as new and desire to secure by Letters Patent—

A filling machine, comprising a reservoir, funnels secured on the said reservoir and adapted to discharge into the vessels to be filled, elastic valves adapted to close the said funnels and provided with upwardly extending rods, shafts mounted to turn above and in line with the said funnels and each provided with a series of arms, each of said arms being pivotally connected with a valve rod, an arm secured to one end of said shaft and adapted when moved in one direction to turn said shaft and swing the series of arms connected with the valve rods upward to move the valves from their seats, and when moved in the opposite direction to swing the said arms downward to a vertical position, whereby the said arms and valve rods are brought into line beneath the shaft and the valves are compressed against their seats and held against direct upward movement, and a longitudinally extending rod to which the arms on the ends of the shafts are pivoted, as and for the purpose set forth.

JOHN F. WOLVEN.

Witnesses:
EDWIN T. SOLIS,
JAMES H. CADY.